(12) United States Patent
Kim et al.

(10) Patent No.: US 9,776,388 B2
(45) Date of Patent: Oct. 3, 2017

(54) FILM PEELING APPARATUS

(71) Applicant: SAMSUNG DISPLAY CO., LTD., Yongin, Gyeonggi-Do (KR)

(72) Inventors: Seung Jin Kim, Asan-si (KR); Jae Pil Lee, Cheonan-si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 14/887,045

(22) Filed: Oct. 19, 2015

(65) Prior Publication Data

US 2016/0207298 A1 Jul. 21, 2016

(30) Foreign Application Priority Data

Jan. 16, 2015 (KR) .................... 10-2015-0008161

(51) Int. Cl.
 *B32B 38/10* (2006.01)
 *B32B 43/00* (2006.01)

(52) U.S. Cl.
 CPC ............ *B32B 43/006* (2013.01); *B32B 38/10* (2013.01); *Y10T 156/1132* (2015.01); *Y10T 156/1184* (2015.01); *Y10T 156/1944* (2015.01); *Y10T 156/1967* (2015.01)

(58) Field of Classification Search
 CPC . B32B 38/10; B32B 43/006; Y10T 156/1132; Y10T 156/1184; Y10T 156/1944; Y10T 156/1967
 USPC .......... 156/707, 717, 758, 762, 924; 83/100, 83/152
 See application file for complete search history.

(56) References Cited

U.S. PATENT DOCUMENTS

| 4,264,405 | A | * | 4/1981 | Petrov | ..................... C25C 7/08 156/750 |
|---|---|---|---|---|---|
| 5,897,743 | A | * | 4/1999 | Fujimoto | ............... B26D 3/282 156/701 |
| 6,653,205 | B2 | * | 11/2003 | Yanagita | ........... H01L 21/67092 156/763 |
| 6,746,559 | B2 | * | 6/2004 | Ohmi | ................ H01L 21/67092 156/239 |
| 7,187,162 | B2 | * | 3/2007 | Kerdiles | ................ G01N 19/04 156/765 |

(Continued)

FOREIGN PATENT DOCUMENTS

| KR | 10-0556339 B1 | 3/2006 |
|---|---|---|
| KR | 10-1097344 B1 | 12/2011 |

(Continued)

*Primary Examiner* — Philip Tucker
*Assistant Examiner* — Nickolas Harm
(74) *Attorney, Agent, or Firm* — Lee & Morse P.C.

(57) ABSTRACT

A film peeling apparatus that peels off a film from a peeling object having the film and a substrate, the film peeling apparatus including a base; a conveying unit to hold a first side of the peeling object and to turn the peeling object from a parallel orientation with respect to the base to a perpendicular orientation with respect to the base; a first peeling unit to receive the peeling object from the conveying unit and to hold a second side of the peeling object in the perpendicular orientation; a second peeling unit to hold the first side of the peeling object, the second peeling unit facing the first peeling unit; and a knife unit that is reciprocably movable toward and away from an edge of the peeling object and movable along an edge of the peeling object.

12 Claims, 8 Drawing Sheets

(56) References Cited

U.S. PATENT DOCUMENTS

| | | | |
|---|---|---|---|
| 8,360,129 B2* | 1/2013 | Ebata | B65H 41/00 |
| | | | 156/714 |
| 8,833,423 B2* | 9/2014 | Chida | B29C 63/02 |
| | | | 156/759 |
| 2003/0089455 A1* | 5/2003 | Sakaguchi | H01L 21/67092 |
| | | | 156/755 |
| 2003/0121601 A1* | 7/2003 | Tajima | G09F 7/18 |
| | | | 156/254 |
| 2005/0150597 A1* | 7/2005 | Henley | B28D 5/00 |
| | | | 156/755 |

FOREIGN PATENT DOCUMENTS

| KR | 10-1297378 B1 | 8/2013 |
|---|---|---|
| KR | 10-2014-0036594 A | 3/2014 |
| KR | 10-2014-0141841 A | 12/2014 |

* cited by examiner

FILM PEELING APPARATUS

CROSS-REFERENCE TO RELATED APPLICATION

Korean Patent Application No. 10-2015-0008161, filed on Jan. 16, 2015, in the Korean Intellectual Property Office, and entitled: "Film Peeling Apparatus," is incorporated by reference herein in its entirety.

BACKGROUND

1. Field

Embodiments relate to a film peeling apparatus.

2. Description of the Related Art

In the process of manufacturing display devices, e.g., an organic light emitting diode display, a film may be applied to protect substrates, e.g., glass with organic materials deposited thereon, and a film peeling apparatus may be used to peel off the film.

The above information disclosed in this Background section is only for enhancement of understanding of the background of the invention and therefore it may contain information that does not form the prior art that is already known in this country to a person of ordinary skill in the art.

SUMMARY

Embodiments are directed to a film peeling apparatus.

The embodiments may be realized by providing a film peeling apparatus that peels off a film from a peeling object having the film and a substrate, the film peeling apparatus including a base; a conveying unit to hold a first side of the peeling object and to turn the peeling object from a parallel orientation with respect to the base to a perpendicular orientation with respect to the base; a first peeling unit to receive the peeling object from the conveying unit and to hold a second side of the peeling object in the perpendicular orientation; a second peeling unit to hold the first side of the peeling object, the second peeling unit facing the first peeling unit; and a knife unit that is reciprocally movable toward and away from an edge of the peeling object and movable along an edge of the peeling object.

The conveying unit may include a first actuator to supply torque to a driving shaft; a first holder that is connected to the driving shaft and that has a plurality of holes at a first side; and a first control valve to control a negative holding pressure of the first holder.

When the first peeling unit holds the second side of the peeling object, the first control valve may stop the negative holding pressure of the first holder.

The first peeling unit may include a second holder that has a plurality of holes at a first side; a second control valve to control a negative holding pressure of the second holder; and a second actuator to tilt the second holder, the second actuator being mounted on a second side of the second holder.

The second actuator may include a first cylinder; a first piston to reciprocate in the first cylinder; and a first piston rod having one end connected to the first piston and another end connected to the second holder.

A plurality of the second actuators may be provided, and the second actuators may include a first pair of second actuators at a same height relative to the base; and a second pair of second actuators at a same height as one another and at a height that is different from the height of the first pair of second actuators.

The second side of the second holder may have a rectangular shape, and the second actuators may be mounted adjacent to respective corners on the second side of the second holder.

The second peeling unit may include a third holder that has a plurality of holes at a first side; a third control valve to control a negative holding pressure of the third holder; and a third actuator to tilt the third holder, the third actuator being mounted on a second side of the third holder.

The third actuator may include a second cylinder; a second piston to reciprocate in the second cylinder; and a second piston rod having one end connected to the second piston and another end connected to the third holder.

A plurality of the third actuators may be provided, and the third actuators may include a first pair of third actuators at a same height relative to the base; and a second pair of third actuators at a same height as one another and at a height that is different from the height of the first pair of third actuators.

The second side of the third holder may have a rectangular shape, and the third actuators may be mounted adjacent to respective corners on the second side of the third holder.

The knife unit may include a knife; a linear guide disposed in parallel with an edge of the peeling object; a linear motor mounted on the linear guide; a third cylinder fixed to the linear motor; a third piston to reciprocate in the third cylinder; and a third piston rod having one end connected to the third piston and another end connected to the knife.

A plurality of knife units may be provided, and the knife units may be arranged to face respective edges of the peeling object.

The first peeling unit may include a first pair of second actuators at a same height relative to the base; and a second pair of second actuators at a same height as one another and at a height that is different from the height of the first pair of second actuators, and the second peeling unit may include a first pair of third actuators at a same height as the first pair of second actuators relative to the base; and a second pair of third actuators at a same height as the second pair of second actuators, and when an edge is split by the knife unit, the first pair of second actuators and the first pair of third actuators, which are at the same height, may operate to tilt the first peeling unit and the second peeling unit are away from each other.

After the first peeling unit and the second peeling unit are tilted, the second pair of second actuators and the second pair of third actuators, which are at the same height, may operate to tilt the first peeling unit and the second peeling unit back to be perpendicular to the base.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
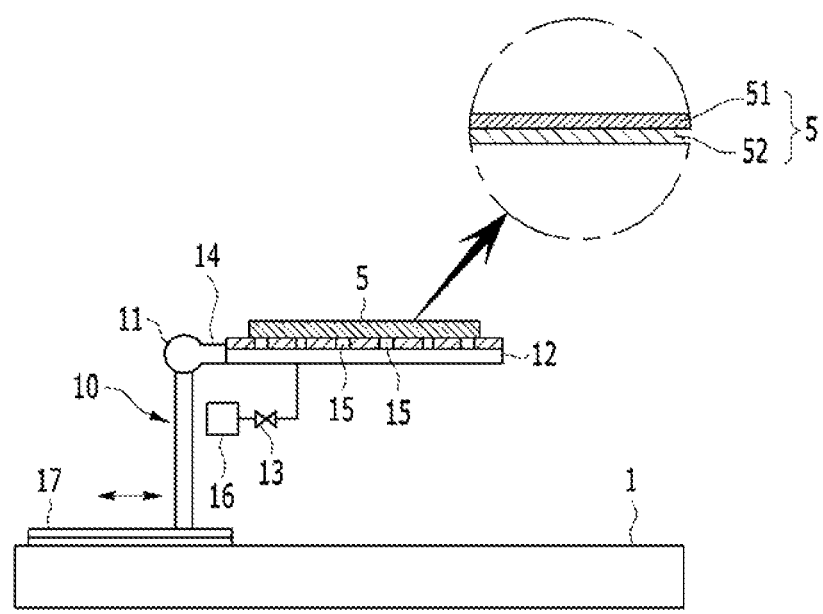
FIG. 1 illustrates a cross-sectional view of a conveying unit of a film peeling apparatus according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Terms using ordinal numbers such as "first" and "second" are used to describe various components, but the components are not limited to the terms. The terms are used only to discriminate one component from another component.

Figure 2:
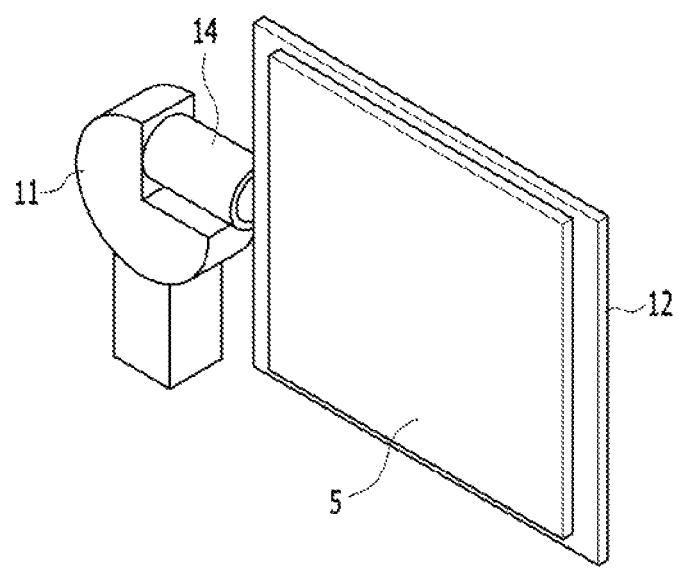
FIG. 2 illustrates a perspective view of a peeling object held by the conveying unit perpendicular to the base in accordance with an exemplary embodiment.
Figure 3:
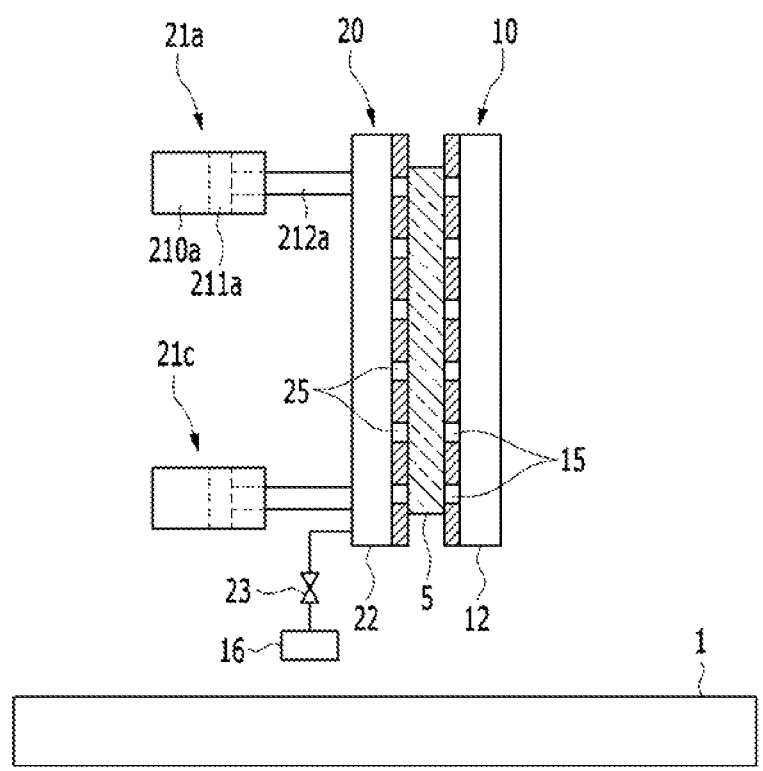
FIG. 3 illustrates a cross-sectional view of a first peeling unit holding a peeling object according to an exemplary embodiment.
Figure 4:
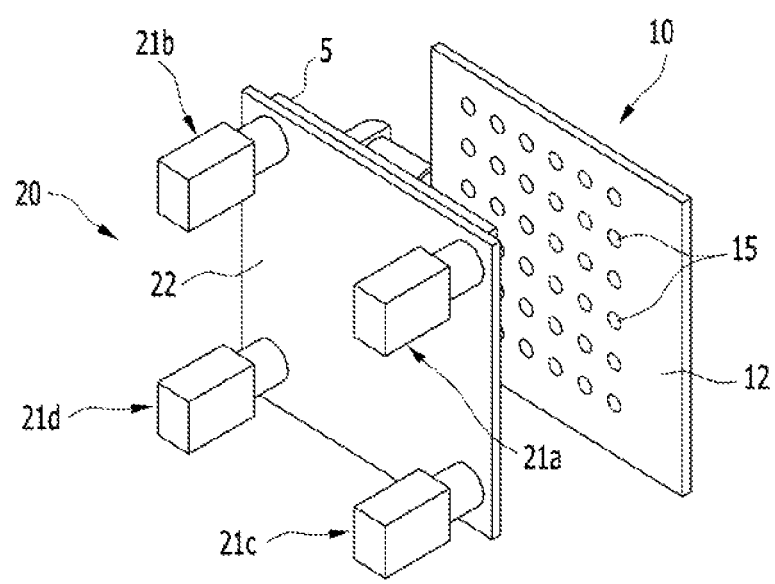
FIG. 4 illustrates a perspective view of the first peeling unit receiving a peeling object from the conveying unit according to an exemplary embodiment.
Figure 5:
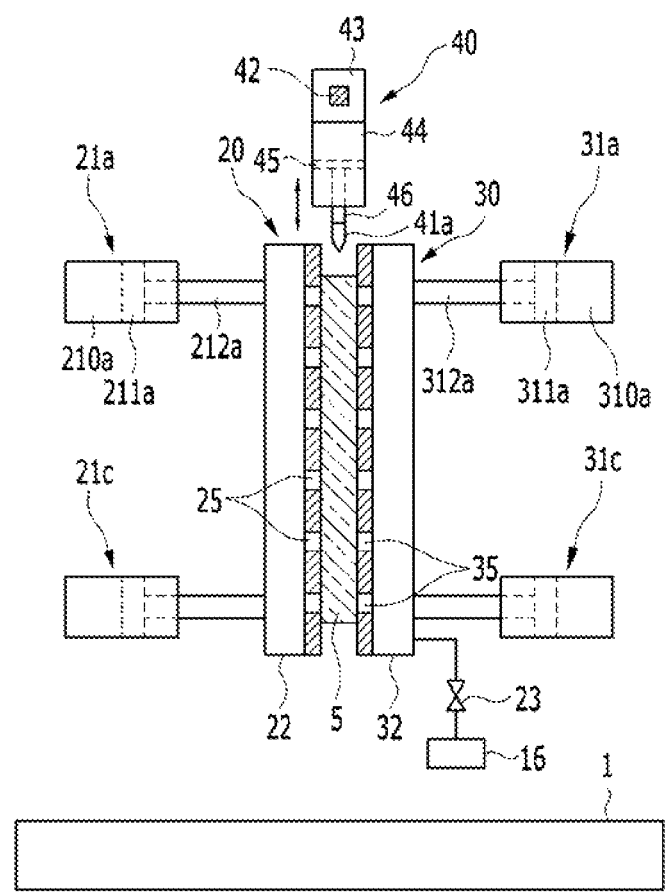
FIG. 5 illustrates a cross-sectional view of a knife unit moving toward an edge of a peeling object according to an exemplary embodiment.
Figure 6:
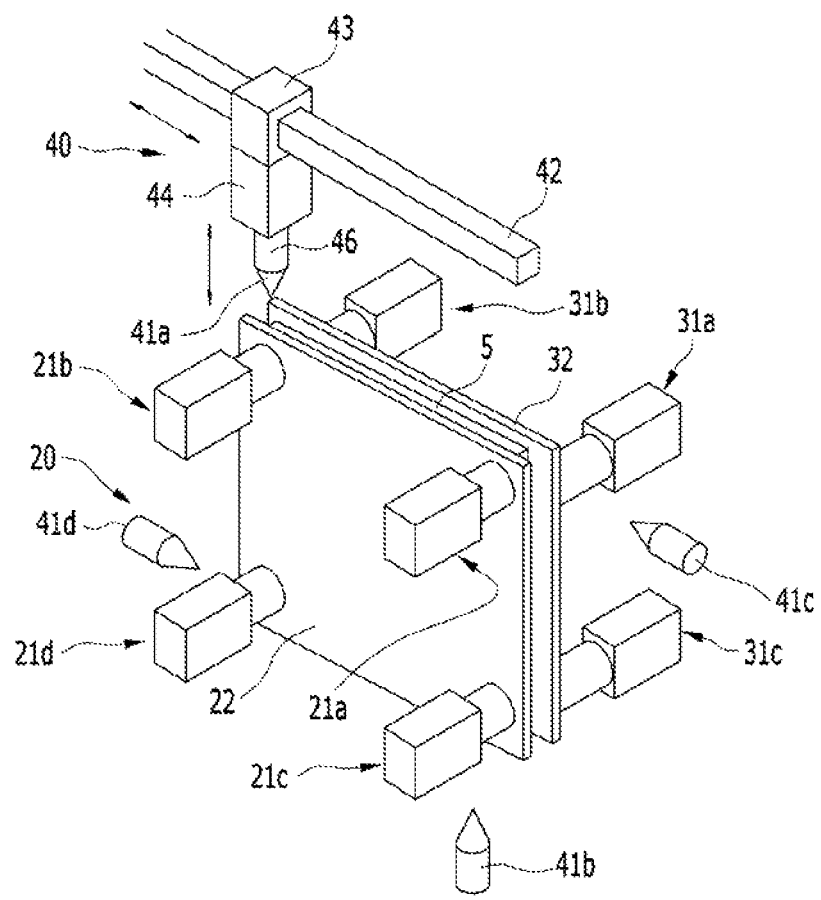
FIG. 6 illustrates a perspective view of a knife unit moving along an edge of the peeling object according to an exemplary embodiment.
Figure 7:
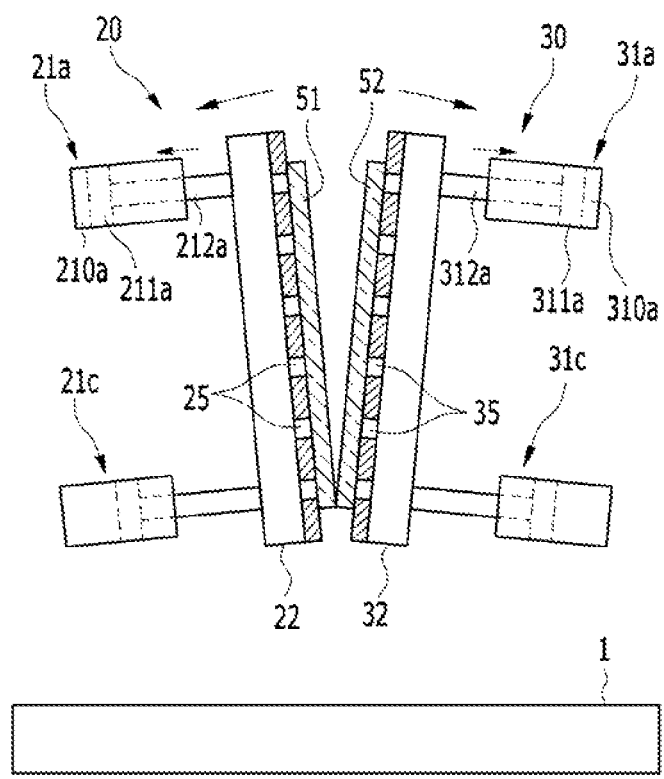
FIG. 7 illustrates a cross-sectional view of the first peeling unit and a second peeling unit, which are tilted, according to an exemplary embodiment.
Figure 8:
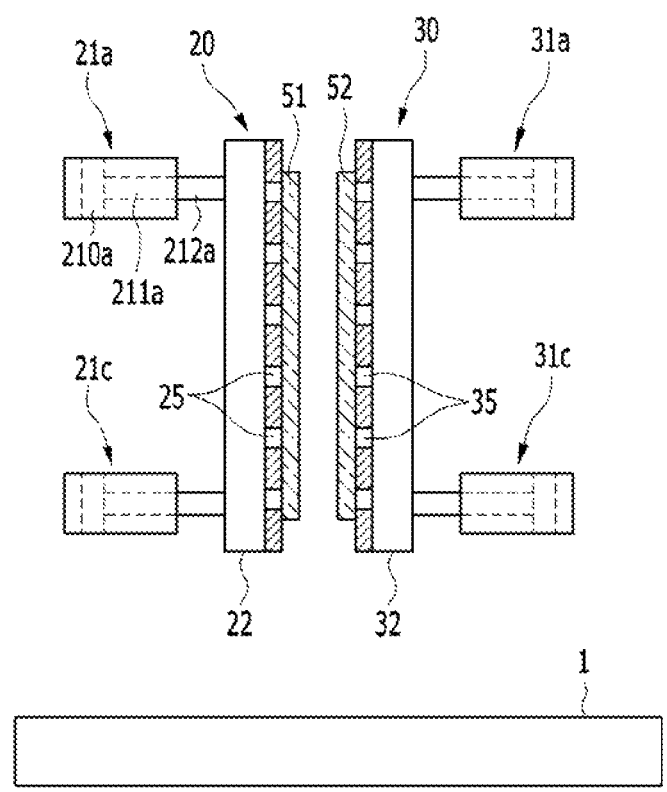
FIG. 8 illustrates a cross-sectional view of the first peeling unit and a second peeling unit that have peeled off the peeling object according to an exemplary embodiment.

FIG. 1 illustrates a cross-sectional view of a conveying unit of a film peeling apparatus according to an exemplary embodiment. FIG. 2 illustrates a perspective view of a peeling object held by the conveying unit perpendicular to the base in accordance with an exemplary embodiment. FIG. 3 illustrates a cross-sectional view of a first peeling unit holding a peeling object according to an exemplary embodiment. FIG. 4 illustrates a perspective view of the first peeling unit receiving a peeling object from the conveying unit according to an exemplary embodiment. FIG. 5 illustrates a cross-sectional view of a knife unit moving toward an edge of a peeling object according to an exemplary embodiment. FIG. 6 illustrates a perspective view of a knife unit moving along an edge of the peeling object according to an exemplary embodiment. FIG. 7 illustrates a cross-sectional view of the first peeling unit and a second peeling unit, which are tilted, according to an exemplary embodiment. FIG. 8 illustrates a cross-sectional view of the first peeling unit and a second peeling unit that have peeled off the peeling object according to an exemplary embodiment.

A film peeling apparatus according to an exemplary embodiment may include a conveying unit 10, a first peeling unit 20, a second peeling unit 30, and a knife unit 40. A peeling object 5 (to be peeled by the film peeling apparatus) may include a film 51 and a substrate 52. In an implementation, an organic material layer may be, e.g., deposited, between the film 51 and the substrate 52.

First, the conveying unit 10 is described.

Referring to FIGS. 1 and 2, the conveying unit 10 according to an exemplary embodiment may receive one of a plurality of peeling objects 5 in or from a cassette, and may move the peeling object 5 to a predetermined position on a base 1. The predetermined position means a position where the film 51 on the peeling object 5 is peeled off by the first peeling unit 20, the second peeling unit 30, and the knife unit 40, which will be described below. To this end, the conveying unit 10 may reciprocate along a guide rail 17 on the base 1.

The conveying unit 10 according to an exemplary embodiment may include, e.g., a first actuator 11, a first sucker or holder 12, and a first control valve 13.

The first actuator 11 may supply torque to a driving shaft 14. The first actuator 11 may be a servo motor.

The first holder 12 may be connected to the driving shaft 14 and may be rotated about the driving shaft 14 by the first actuator 11. A plurality of holes 15 may be formed at a first side of the first holder 12. When a negative pressure (e.g., pressure sucking air) is generated or provided inside the first holder 12, a first side of the peeling object 5 may be firmly sucked or held on the first holder 12. For example, the first holder 12 may firmly hold the peeling object 5 due to the force of the negative or vacuum pressure sucking against the peeling object 5.

The first control valve 13 may control the negative pressure that is generated inside the first holder 12. The first control valve 13 may pass negative pressure generated by a pump 16 to the first holder 12, or may stop the negative pressure from being provided to the first holder 12.

The peeling object 5 may be held on the first holder 12 by the negative pressure inside the first holder 12, even if the first holder 12 is rotated about the driving shaft 14.

Thus, the conveying unit 10 according to an exemplary embodiment may turn the peeling object 5 from a parallel (or horizontal) position to a perpendicular (or vertical) position with respect to the base 1. The conveying unit 10 may hand over the peeling object 5 in the vertical position to the first peeling unit 20.

As illustrated in FIG. 3, the first peeling unit 20 according to an exemplary embodiment may suck, hold, or be attracted to a second side of the peeling object 5 (in the vertical position).

The first peeling unit 20 according to an exemplary embodiment may include, e.g., a second sucker or holder 22, a second control valve 23, and second actuators 21a, 21b, 21c, and 21d. The second actuators 21a, 21b, 21c, and 21d may each include a first cylinder 210a, a first piston 211a, and a first piston rod 212a. The second actuators 21a, 21b, 21c, and 21d will be described below.

A plurality of holes 25 may be formed at a first side of the second holder 22. When negative pressure is generated or provided inside the second holder 22, the second side of the peeling object 5 may be firmly sucked on or held by the second holder 22.

The second control valve 23 may control the negative pressure that is generated or provided inside the second holder 22. The second control valve 23 may pass negative pressure generated by a pump 16 to the second holder 22, or may stop the negative pressure from being provided to the second holder 22.

The peeling object 5 may be held or attached on the second holder 22 by the negative pressure generated or otherwise provided inside the second holder 22.

As illustrated in FIG. 4, when the second holder 22 holds the second side of the peeling object 5, the first control valve 13 of the conveying unit 10 may stop the negative pressure of the first holder 12, e.g., releasing the peeling object 5 from the first holder 12. Accordingly, the second side of the peeling object 5 may be firmly held on the second holder 22 and may be held perpendicular to the base 1.

The conveying unit 10 may hand over the peeling object 5 in a vertical position to the first peeling unit 20, and may then return along the guide rail 17.

As illustrated in FIGS. 5 and 6, the second peeling unit 30 according to an exemplary embodiment may face the first peeling unit 20 and may suck or hold the first side of the peeling object 5.

The second peeling unit 30 according to an exemplary embodiment may include, e.g., a third sucker or holder 32, a third control valve 33, and third actuators 31a, 31b, 31c, and 31d. The third actuators 31a, 31b, 31c, and 31d may each include a second cylinder 310a, a second piston 311a, and a second piston rod 312a. The third actuators 31a, 31b, 31c, and 31d will be described below.

A plurality of holes 35 may be formed at a first side of the third holder 32. When negative pressure is generated inside or otherwise provided in the third holder 32, the first side of the peeling object 5 may be firmly sucked on or held by the third holder 32.

The third control valve 33 may control the negative pressure that is generated inside or otherwise provided in the third holder 32. The third control valve 33 may pass negative pressure generated by a pump 16 to the third holder 32, or may stop the negative pressure from being provided to the third holder 32.

The peeling object 5 may be held by the third holder 32 due to the negative pressure generated inside or otherwise provided in the third holder 32.

The first peeling unit 20 and the second peeling unit 30 may move along guide rails and may hold the peeling object 5 perpendicular to the base 1 at predetermined positions.

Thereafter, a knife unit 40 according to an exemplary embodiment may move toward an edge of the peeling object 5.

The knife unit 40 according to an exemplary embodiment may be designed to, e.g., reciprocate to and away from the edges of the peeling object 5, and may move along the edges after moving close to the edges. A plurality of, e.g., four, knife units 40 may be provided, facing the edges of the peeling object 5, respectively. In this configuration, four knives 41a, 41b, 41c and 41d may separate the edges of the peeling object 5, respectively.

The knife unit 40 may include, e.g., a knife 41a, a linear guide 42, a linear motor 43, a third cylinder 44, a third piston 45, and a third piston rod 46.

The knife 41a may come in contact with the joint between the film 51 and the substrate 52 of the peeling object 5 and may separate the edge of the film 51 and the edge of the substrate 52. For example, the knife 41a may be tapered.

The linear guide 42 may be disposed in parallel with an edge of the peeling object 5.

The linear motor 43 may be mounted on the linear guide 42, and the third cylinder 44 may be mounted on the linear motor 43. When the linear motor 43 operates, the third cylinder 44 may reciprocate along the linear guide 42 in parallel with an edge of the peeling object 5.

The third piston 45 may reciprocate in the third cylinder 44.

The third piston rod 46 may have one end connected to the third piston 45 and another end connected to the knife 41a. When the third cylinder 44 is operated, the knife 41a may reciprocate toward and away from an edge of the peeling object 5.

When an edge of the peeling object 5 is split by the knife unit 40, e.g., between the film 51 and the substrate 52, the first peeling unit 20 and the second peeling unit 30 may be tilted away from each other, so the film 51 may be peeled off from the substrate 52.

To this end, the second actuators 21a, 21b, 21c and 21d of the first peeling unit 20 may be disposed on a second side of the second holder 22 to tilt the second holder 22, e.g., away from the third holder 32. For example, the second side of the second holder 22 may have a rectangular shape, and the second actuators 21a, 21b, 21c and 21d may be disposed close or adjacent to the corners, respectively, of the second side of the second holder 22.

A pair of the second actuators 21a and 21b may be positioned at a same height from the base 1, e.g., laterally aligned with one another. Another pair of the second actuators 21c and 21d may be positioned at a predetermined height, different from that of the pair of second actuators 21a and 21b, and may also be laterally aligned with one another. For example, on the second holder 22, the second actuators 21a and 21b may be disposed at an upper portion (e.g., distal to the base 1) and the second actuators 21c and 21d may be disposed at a lower portion (e.g., proximate to the base 1).

The second actuators 21a, 21b, 21c, and 21d may each include a first cylinder 210a, a first piston 211a, and a first piston rod 212a.

The first piston 211a may reciprocate in the first cylinder 210a.

The first piston rod 212a may have an end connected to the first piston 211a and another end connected to the second holder 22.

When the second actuators 21a and 21b (at the upper portion of the second holder 22) are simultaneously operated, and the second actuators 21c and 21d (at the lower portion of the second holder 22) are not operated, the second holder 22 may be tilted, e.g., away from the third holder 32.

After the second holder 22 is tilted, the second actuators 21c and 21d at the lower portion on the second holder 22 may be simultaneously operated. Accordingly, the second holder 22 may be turned or tilted back to be perpendicular to the base 1.

To this end, the third actuators 31a, 31b, 31c and 31d of the second peeling unit 30 may be disposed on a second side of the third holder 32 to tilt the third holder 32. For example, the second side of the third holder 32 may have a rectangular shape, and the third actuators 31a, 31b, 31c and 31d may be disposed close or adjacent to the corners, respectively, of the second side of the third holder 32.

A pair of the third actuators 31a and 31b may be positioned at a same height from the base 1, e.g., laterally aligned to one another. Another pair of the third actuators 31c and 31d may be positioned at a predetermined height different from that of the pair of third actuators 31a and 31b, e.g., and laterally aligned with one another. For example, on the third holder 32, the third actuators 31a and 31b may be disposed at an upper portion (e.g., distal to the base 1) and the third actuators 31c and 31d may be disposed at a lower portion (e.g., proximate to the base). In an implementation, the pair of third actuators 31a and 31b may be at a same height as the pair of second actuators 21a and 21b, and the other pair of third actuators 31c and 31d may be at a same height as the other pair of second actuators 21c and 21d.

The third actuators 31a, 31b, 31c, and 31d may each include a second cylinder 310a, a second piston 311a, and a second piston rod 312a.

The second piston 311a may reciprocate in the second cylinder 310a.

The second piston rod 312a may have an end connected to the second piston 311a and another end connected to the third holder 32.

When the third actuators 31a and 31b at the upper portion of the third holder 32 are simultaneously operated, and the third actuators 31c and 31d at the lower portion of the third holder 32 are not operated, the third holder 32 may be tilted, e.g., away from the second holder 22.

After the third holder 32 is tilted, the third actuators 31c and 31d at the lower portion of the third holder 32 may be simultaneously operated. Accordingly, the third holder 32 may be turned or tilted back to be perpendicular to the base 1.

For example, when the an edge of the peeling object 5 is split by the knife unit 40, the pair of second actuators 21a and 21b and the pair of third actuators 31a and 31b, which are at the same height, may be operated. Thus, the first peeling unit 20 and the second peeling unit 30 may be tilted away from each other. Accordingly, the film may be separated down toward the base 1 from the top of the peeling object 5.

After the first peeling unit 20 and the second peeling unit 30 are tilted away from each other, the other pair of second actuators 21c and 21d and the other pair of third actuators 31c and 31d, which are at the same height, may be operated. Thus, the first peeling unit 20 and the second peeling unit 30 may be turned or tilted back to be perpendicular to the base 1.

By way of summation and review, some film peeling apparatuses peel off a film with a substrate horizontally disposed. For example, a substrate (with a film thereon) may be disposed horizontally on a belt, and the film may be peeled off while the substrate is horizontally moved.

Such a film peeling apparatus may require a large area to be installed in, as display devices increase in size and the width and length of belts increase accordingly. Further, organic materials may drop onto important parts of equipment and may contaminate them while a film is peeled off. In addition, the tension of a belt may change due to long-period use, and uniform peeling off of films may not be achieved.

The embodiments may provide a film peeling apparatus having advantages of being able to peel off a film from a substrate that is vertically disposed with the film.

According to an exemplary embodiment a film may be peeled off from a substrate that is held vertically, and the film may be uniformly peeled off.

Further, it is possible to prevent organic materials from contaminating important components of equipment when peeling off a film and it is possible to minimize the area for installing a film peeling apparatus.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS

1: Base
5: Peeling object
10: Conveying unit
20: First peeling unit
30: Second peeling unit
40: Knife unit

What is claimed is:

1. A film peeling apparatus that peels off a film from a peeling object having the film and a substrate, the film peeling apparatus comprising:
a conveying unit to hold a first side of the peeling object and to turn the peeling object from a parallel orientation with respect to a base to a perpendicular orientation with respect to a base;
a first peeling unit to receive the peeling object from the conveying unit and to hold a second side of the peeling object in the perpendicular orientation;
a second peeling unit to hold the first side of the peeling object, the second peeling unit facing the first peeling unit; and
a knife unit that is reciprocally movable toward and away from an edge of the peeling object in a first direction and movable along the edge of the peeling object in a second direction perpendicular to the first direction, wherein
the conveying unit includes:
a first actuator to supply torque to a driving shaft;
a first holder that is connected to the driving shaft and that has a plurality of holes at a first side; and
a first control valve to control a negative holding pressure of the first holder, wherein
the first peeling unit includes:
a second holder that has a plurality of holes at a first side;
a second control valve to control a negative holding pressure of the second holder; and
a second actuator to tilt the second holder, the second actuator being mounted on a second side of the second holder, and wherein
the second peeling unit includes:
a third holder that has a plurality of holes at a first side;
a third control valve to control a negative holding pressure of the third holder; and
a third actuator to tilt the third holder, the third actuator being mounted on a second side of the third holder.

2. The apparatus as claimed in claim 1, wherein, when the first peeling unit holds the second side of the peeling object, the first control valve stops the negative holding pressure of the first holder.

3. The apparatus as claimed in claim 1, wherein the second actuator includes:
a first cylinder;
a first piston to reciprocate in the first cylinder; and
a first piston rod having one end connected to the first piston and another end connected to the second holder.

4. The apparatus as claimed in claim 1, wherein:
the second actuator includes a plurality of second actuators,
the plurality of second actuators include:
a first pair of second actuators at a same height relative to the base; and
a second pair of second actuators at a same height as one another and at a height that is different from the height of the first pair of second actuators.

5. The apparatus as claimed in claim 1, wherein:
the second side of the second holder has a rectangular shape, and
the second actuators are mounted adjacent to respective corners on the second side of the second holder.

6. The apparatus as claimed in claim 1, wherein the third actuator includes:
a second cylinder;
a second piston to reciprocate in the second cylinder; and
a second piston rod having one end connected to the second piston and another end connected to the third holder.

7. The apparatus as claimed in claim 1, wherein:
the third actuator includes a plurality of third actuators, the plurality of third actuators include:
a first pair of third actuators at a same height relative to the base; and
a second pair of third actuators at a same height as one another and at a height that is different from the height of the first pair of third actuators.

8. The apparatus as claimed in claim 1, wherein:
the second side of the third holder has a rectangular shape, and
the third actuators are mounted adjacent to respective corners on the second side of the third holder.

9. The apparatus as claimed in claim 1, wherein the knife unit includes:
a knife;
a linear guide disposed in parallel with the edge of the peeling object, the knife being movable along the linear guide in the second direction;
a linear motor mounted on the linear guide;
a third cylinder fixed to the linear motor;
a third piston to reciprocate in the third cylinder in the first direction; and
a third piston rod having one end connected to the third piston and another end connected to the knife.

10. The apparatus as claimed in 1, wherein:
a plurality of knife units is provided, and
the knife units are arranged to face respective edges of the peeling object, the plurality of knife units being movable along the respective edges in different directions.

11. A film peeling apparatus that peels off a film from a peeling object having the film and a substrate, the film peeling apparatus comprising:
a conveying unit to hold a first side of the peeling object and to turn the peeling object from a parallel orientation with respect to a base to a perpendicular orientation with respect to the base;
a first peeling unit to receive the peeling object from the conveying unit and to hold a second side of the peeling object in the perpendicular orientation;
a second peeling unit to hold the first side of the peeling object, the second peeling unit facing the first peeling unit; and
a knife unit that is reciprocally movable toward and away from an edge of the peeling object in a first direction and movable along the edge of the peeling object in a second direction perpendicular to the first direction, wherein the conveying unit includes:
a first actuator to supply torque to a driving shaft; and
a first holder that is connected to the driving shaft and that has a plurality of holes at a first side, and wherein:
the first peeling unit includes:
a first pair of second actuators at a same height relative to the base; and
a second pair of second actuators at a same height as one another and at a height that is different from the height of the first pair of second actuators, and
the second peeling unit includes:
a first pair of third actuators at a same height as the first pair of second actuators relative to the base; and
a second pair of third actuators at a same height as the second pair of second actuators, and
when an edge is split by the knife unit, the first pair of second actuators and the first pair of third actuators, which are at the same height, operate to tilt the first peeling unit and the second peeling unit are away from each other.

12. The apparatus as claimed in claim 11, wherein, after the first peeling unit and the second peeling unit are tilted, the second pair of second actuators and the second pair of third actuators, which are at the same height, operate to tilt the first peeling unit and the second peeling unit back to be perpendicular to the base.

* * * * *